United States Patent [19]
Kaneda et al.

[11] 4,433,402
[45] Feb. 21, 1984

[54] REFERENCE SIGNAL DETECTION CIRCUIT IN A ROTARY RECORDING MEDIUM REPRODUCING APPARATUS

[75] Inventors: Isami Kaneda, Yokohama; Susumu Sakakibara, Sagamihara; Yasushi Sano, Yamato, all of Japan

[73] Assignee: Victor Company of Japan, Ltd., Yokohama, Japan

[21] Appl. No.: 310,767

[22] Filed: Oct. 13, 1981

[30] Foreign Application Priority Data

Oct. 13, 1980 [JP]    Japan ................................. 55-142748

[51] Int. Cl.³ ............................................. G11B 21/10
[52] U.S. Cl. ........................................ 369/43; 369/50; 358/342
[58] Field of Search .................... 369/43, 44, 50, 124, 369/111; 360/77; 250/202; 358/342

[56] References Cited

U.S. PATENT DOCUMENTS

| | | | |
|---|---|---|---|
| 3,985,952 | 10/1976 | Adler | 358/342 |
| 4,063,287 | 12/1977 | van Rosmalen | 369/44 |
| 4,190,859 | 2/1980 | Kinjo | 369/124 |
| 4,223,187 | 9/1980 | Yonezawa | 369/111 |
| 4,247,741 | 1/1981 | Tatsuguchi | 360/77 |
| 4,310,912 | 1/1982 | Kikuchi | 369/43 |

*Primary Examiner*—Alan Faber
*Attorney, Agent, or Firm*—Louis Bernat

[57] ABSTRACT

A reference signal detection circuit in a rotary recording medium reproducing apparatus has a reproducing transducer for reproducing an information signal recorded in a rotary recording medium and reference signals for tracking servo recorded for every predetermined period, from the rotary recording medium rotating at a predetermined rotational speed, and a tracking servo circuit for obtaining a tracking servo signal from the reference signals and performing a tracking servo operation according to the tracking servo signal thus obtained. The detection circuit further comprises a single rectifying and smoothing circuit for rectifying and smoothing the reproduced reference signals obtained for every predetermined period. The detection circuit has a lowpass filter characteristic wherein the cutoff frequency is within a frequency range between one third and twice the gain crossover frequency of the tracking servo loop.

4 Claims, 11 Drawing Figures

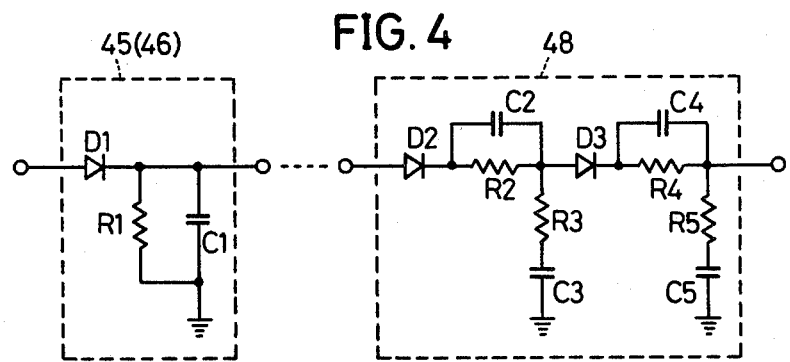
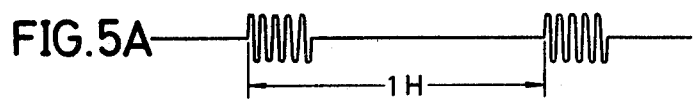
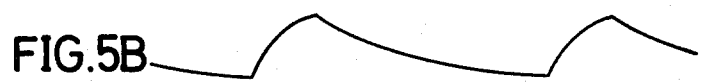
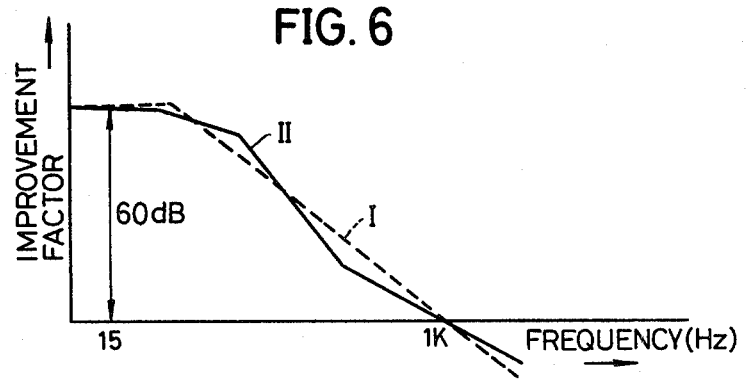

REFERENCE SIGNAL DETECTION CIRCUIT IN A ROTARY RECORDING MEDIUM REPRODUCING APPARATUS

BACKGROUND OF THE INVENTION

The present invention generally relates to reference signal detection circuits in rotary recording medium reproducing apparatuses, and more particularly to a detection circuit capable of detecting reference signals for use by a tracking servo system, the reference being reproduced in a burst-like manner from a rotary recording medium, without introducing aliasing noise, by use of a simple circuit construction.

Systems have been realized in which a recording system forms pits in accordance with information signal being recorded along a spiral track on a flat rotary recording medium (hereinafter referred to as "disc"), without forming a groove therein, and a reproducing stylus traces over along this track to reproduce the recorded information signal in response to variations in the electrostatic capacitance in a reproducing system.

In this system, since no groove is provided on the disc for guiding the reproducing stylus, pilot or reference signals for enabling a tracking servo control are recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

In the above disc, only one of a first and second reference signals fp1 and fp2 is recorded at an intermediate position between center lines of adjacent track turns. Moreover, the side of which the first and second reference signals are recorded with respect to one track turn changes over every one track turn. That is, when the first and second reference signals are respectively recorded on the right and left sides of one track turn, the relationship between the recorded positions of the reference signals is such that the second and first reference signals are respectively recorded on the right and left sides of adjacent track turns. Furthermore, a third reference signal for obtaining a changeover signal upon reproduction, is recorded for every track turn at recording changeover positions of the above first and second reference signals.

In a reproducing apparatus, a changeover operation is performed by use of the third reference signal reproduced upon obtaining of a tracking servo signal from the reproduced first and second reference signals.

Since no grooves are provided in the above disc, the reproducing stylus can be transferred from one track to another without damaging the reproducing stylus or the disc. Accordingly, in addition to the special reproduction such as still reproduction, slow-motion reproduction, and quick-motion reproduction, the system is capable of performing a so-called random access in which the reproducing stylus is transferred to a desired position at high speed to reproduce the desired information.

The above first and second reference signals fp1 and fp2 are recorded in a burst-like manner for every period corresponding to the horizontal blanking period of the video signal which is recorded as the information signal. Hence, in the apparatus for reproducing the above signals recorded in the disc, a detection circuit for detecting these first and second reference signals for tracking servo conventionally consisted of a circuit for rectifying and smoothing input reference signals, and a sample-and-hold circuit having a switching element for sampling the rectified and smoothed signal for every horizontal scanning frequency of 15.75 kHz and a capacitor for holding the sampled signal.

However, since the above conventional detection circuit consists of the circuit for sampling a signal at a frequency of 15.75 kHz, in a case where noise having a frequency of 7 kHz, 14 kHz, and the like is mixed into the signal which is to be sampled, the frequency difference between the above sampling frequency of 15.75 kHz and the noise frequency of 7 kHz, 14 kHz, and the like, is introduced as aliasing noise. When the above aliasing noise frequency is a frequency near the gain cross-over frequency of the tracking servo system, that is, near the frequency where the open-loop again becomes 0 dB, the tracking servo system becomes incapable of performing stable operation due to the aliasing noise frequency since the improvement factor in the vicinity of the gain cross-over frequency is exceedingly small. Therefore, there was a disadvantage in that an accurate tracking servo operation could not be performed.

SUMMARY OF THE INVENTION

Accordingly, it is a general object of the present invention to provide a novel and useful reference signal detection circuit in a rotary recording medium reproducing apparatus, in which the above described disadvantages have been overcome.

Another and more specific object of the present invention is to provide a reference signal detection circuit having no sample-and-hold circuit consisting of a switching element as in the conventional reference signal detection circuit. According to the detection circuit of the present invention, the aliasing noise is not introduced since sampling is not performed at the frequency of 15.75 kHz. Therefore, the operation of the tracking servo system is not affected by the aliasing noise, and a fine tracking servo operation can be performed.

Still another object of the present invention is to provide a reference signal detection circuit in a rotary recording medium reproducing apparatus, wherein the detection circuit has a lowpass filter characteristic, and a cutoff frequency of the lowpass filter characteristic is selected according to the detected reference signals, to a frequency in the vicinity of the cross-over frequency of the tracking servo system which performs the tracking control. According to the detection circuit of the present invention, in addition to requiring no sample-and-hold circuit, noise can be effectively eliminated by the lowpass filter characteristic.

Other objects and further features of the present invention will be apparent from the following detailed description when read in conjunction with the accompanying drawings.

BRIEF DESCRIPTION OF THE DRAWINGS

FIG. 4 is a concrete circuit diagram showing embodiments of a detection circuit and a phase compensation circuit in the block system shown in FIG. 3;

FIGS. 5A and 5B are diagrams respectively showing signal waveforms for explaining the operation of the detection circuit;

FIG. 6 is a diagram showing the gain characteristic of a tracking servo system.

DETAILED DESCRIPTION

First, a description will be given with respect to a rotary recording medium which is reproduced by a rotary recording medium reproducing apparatus having a detection circuit according to the present invention, by referring to FIGS. 1 and 2.

A video signal is recorded on a spiral track with pits formed on the disc 10 responsive to the information contents of the signal. Track turns of a single continuous spiral track, corresponding to each revolution of the disc 10, are designated by $t_1, t_2, t_3 \ldots$ As shown in FIG. 1, each track turn is constituted by the formation of pits 11 of the main information signal along the plane track path and has no stylus guide groove formed therein. With respect to one track turn $t_1$, in every horizontal scanning period (H) at a position corresponding to the horizontal blanking period, pits 12 of a first reference signal fp1 are formed on one lateral side of the track as viewed in the track path direction. Pits 13 of a second reference signal fp2 are formed on the other side of the track.

At an intermediate position between center lines of adjacent track turns, only pits of either one kind of the pits 12 and 13 of the above reference signals fp1 and fp2 are formed, and with respect to one track, moreover, the sides on which the pits 12 and 13 are formed are changed over for every track turn. That is, if pits 12 and 13 are respectively formed on the right and left sides of one track turn, for example, pits 13 and 12 are respectively formed on the right and left sides of each of the adjacent track turns.

Figure 2:
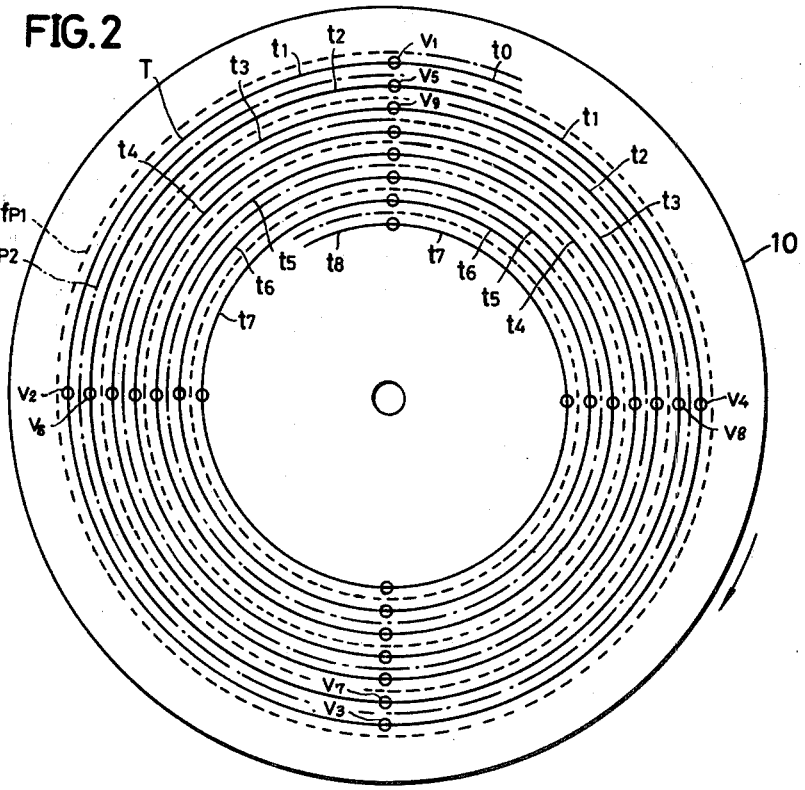
FIG. 2 is a diagram for explaining the recorded state of reference signals on a track pattern on a rotary recording medium.

As indicated in FIG. 2, a video signal is recorded along a spiral track T of the disc 10 for two frames, that is, four fields, per one revolution of the disc. In FIG. 2, the tracks of the reference signal fp1 is shown by dotted lines while the tracks of the reference signal fp2 is shown by one-dot chain lines. The positions of the vertical synchronizing signals of respective fields are designated by reference characters V1, V2, V3, ..., and the successive track parts corresponding to one revolution of the disc of a single spiral track I are respectively designated by track turns $t_1, t_2, t_3, \ldots$. Furthermore, a third reference signal fp3 is recorded at the starting end positions V1, V5, V9, ... of each track turns $t_1, t_2, t_3, \ldots$, that is, at positions where the reference signals fp1 and fp2 change over.

Figure 1:
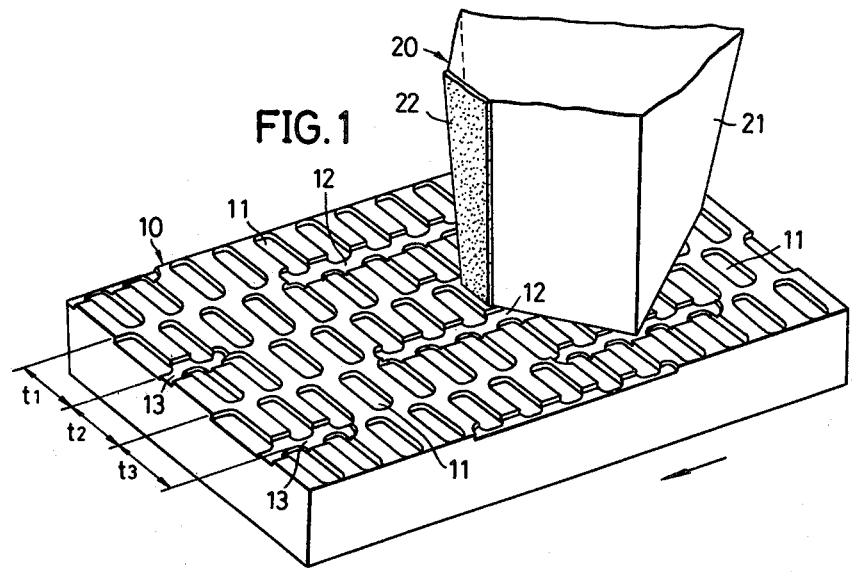
FIG. 1 is a perspective view showing a part of a rotary recording medium in an enlarged state together with a tip end part of a reproducing stylus.

The tip end of a reproducing stylus 20 has a shape shown in FIG. 1. The reproducing stylus 20 consists of a stylus structure 21 having a disc tracing surface which has a width greater than a track width, and an electrode 22 fixed to the rear face of the stylus structure 21. As the reproducing stylus 20 traces along a track on the disc 10 which is rotating in a direction indicated by an arrow, the video signal recorded thereon by the formation of pits is reproduced as variations in the electrostatic capacitance between the surface of the disc 10 and the electrode 22 of the reproducing stylus 20.

Figure 3:
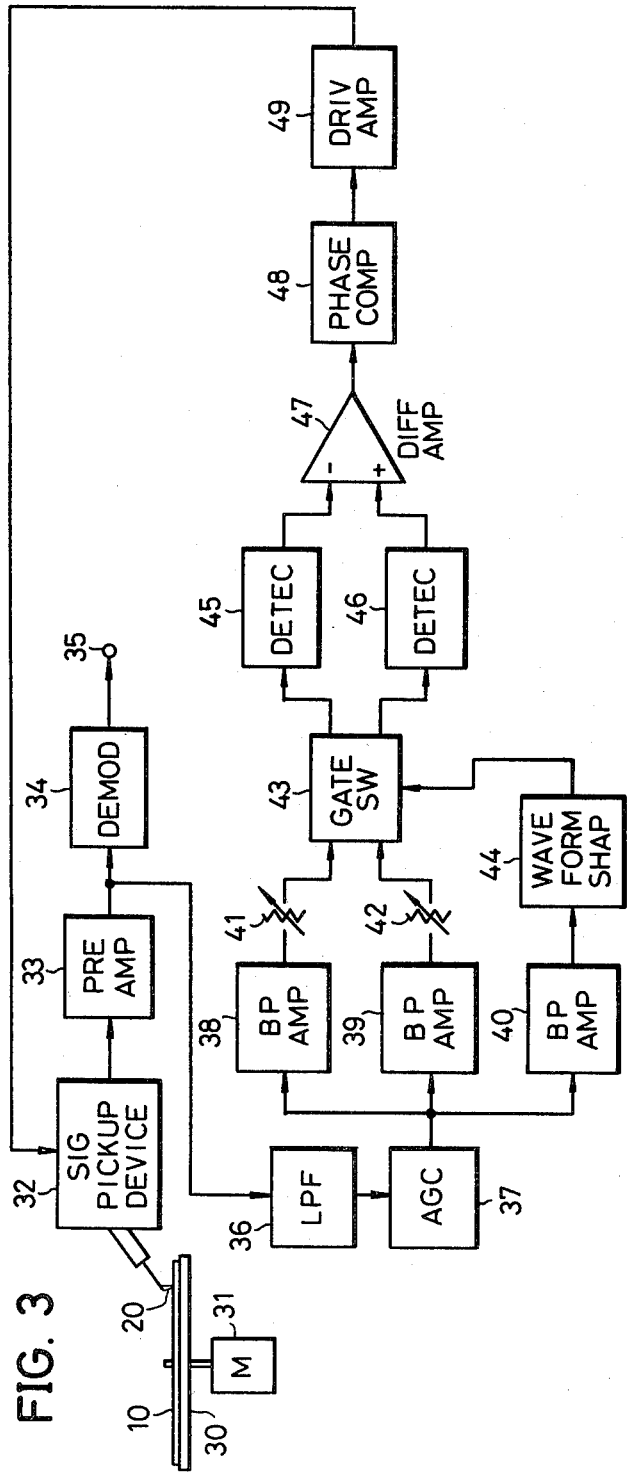
FIG. 3 is a systematic block diagram showing an embodiment of a rotary recording medium reproducing apparatus applied with a reference signal detection circuit according to the present invention.

In FIG. 3, the disc 10 is placed onto a turntable 30, and rotated at a rotational speed of fifteen revolutions per second, that is, 900 revolutions per minute, by a motor 31. A reproduced signal picked up from the disc 10 as minute variations in the electrostatic capacitance by the reproducing stylus 20 of a signal pickup device 32, is supplied to a preamplifier 33 having a resonant circuit. The resonance frequency of the resonant circuit varies in response to this variation in the electrostatic capacitance, and is formed into a signal of a desired level. The resulting output of the preamplifier 33, is demodulated into the original video signal by a demodulator 34 and is obtained as an output through an output terminal 35.

The output signal of the preamplifier 33 is supplied to a lowpass filter 36 wherein the reference signals fp1, fp2, and fp3 are separated. The output reference signals pass through an automatic gain control circuit 37 and are respectively supplied to amplifiers 38, 39, and 40. Here, each of the amplifiers 38, 39, and 40 is a kind of a band-pass amplifier respectively designed to have steep passing frequency characteristics at only the respective frequency fp1, fp2 and fp3. As a result, the signals having frequencies fp1 and fp2 are respectively separated and obtained from the amplifiers 38 and 39. These signals respectively pass through level adjustors 41 and 42, wherein the levels of the signal are adjusted. The resulting signals are then supplied to a gate switching circuit 43.

The reference signal fp3 separated and amplified at the above band-pass amplifier 40, is supplied to a waveform shaping circuit 44 comprising a Schmitt circuit. The signal thus supplied to the waveform shaping circuit 44 undergoes waveform-shaping so that the signal is not affected by noise and other influences. The reference signal fp3 thus subjected to the waveform-shaping, is supplied to the gate switching circuit 43 as a switching pulse.

The gate switching circuit 43 performs switching of the reference signals fp1 and fp2 every one revolution period of the disc 10 upon normal reproduction, in response to the above switching pulse applied thereto. Hence, due to the switching pulse which reverses polarity every two frames (1/15 seconds), the reference signals fp1 and fp2 are always alternately supplied to detection circuits 45 and 46 according to the present invention with predetermined polarities, from the gate switching circuit 43.

The detection circuits 45 and 46 detect their respective input reference signals, and convert the input reference signals into DC voltages. These DC voltages are then respectively supplied to a differential amplifier 47. The differential amplifier 47 compares the output signals of the two detection circuits 45 and 46 which vary in response to the reproduced levels of the reference signals fp1 and fp2, and generates an output tracking error signal which indicates the tracking error direction and the error quantity. This error signal passes through a phase compensation circuit 48 and is further amplified to a specific level by a driving amplifier 49.

An output signal of the driving amplifier 49 is applied to a coil of the signal pickup device 32 as a control signal, to control the signal pickup device 32. Accordingly, a cantilever mounted with the reproducing stylus 20 undergoes displacement whereby the reproducing stylus 20 is tracking controlled so that the above tracking error signal becomes zero, that is, so that the reproducing stylus 20 correctly traces over the track T of the disc 10.

Next, description will be given with respect to the detection circuits 45 (46). The detection circuit 45 (46) consists of a rectifying diode D1, a smoothing capacitor C1, and a resistor R1 as shown in FIG. 4, for example, and performs a detecting operation by use of a time constant. That is, the reproduced and separated first and second reference signals exist in a burst-like manner for every one horizontal scanning period (1H), as shown in FIG. 5A. These reference signals are rectified, smoothed, and then detected as shown in FIG. 5B by the detection circuit 45 (46).

In the detection circuit according to the present invention, sampling is not performed by the opening and closing of a switching element at the horizontal scanning frequency of 15.75 kHz, as in the conventional detection circuit. Hence, aliasing noise is not introduced due to the sampling operation. Accordingly, the tracking servo system does not loose its stability due to the above aliasing noise, to enable a fine tracking servo operation. Moreover, the circuit construction of the detection circuit according to the present invention is simple, since a sample-and-hold circuit including the above switching element, and a circuit for driving the switching element are respectively not required.

A gain characteristic of the whole open-loop within the tracking servo system, is desirably a characteristic indicated by a dotted line I in FIG. 6. That is, since the disc 10 is rotated at a rotational speed of 15 revolutions per second, it is desirable to select a characteristic which is capable of obtaining a high improvement factor of approximately 60 dB, for example, at a frequency of 15 Hz. The gain cross-over frequency is approximately 1 kHz, when considering the various conditions.

Figure 7A:
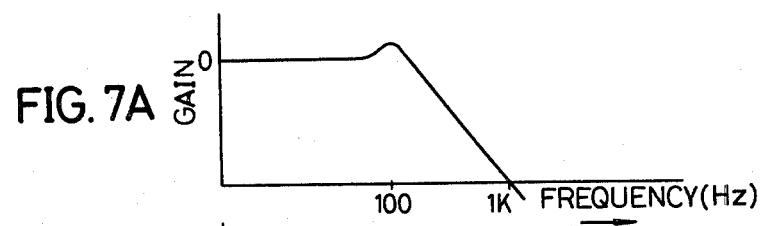
FIGS. 7A, 7B, 7C, and 7D are diagrams respectively showing gain characteristics of a mechanical system in a signal pickup device, a phase compensation circuit, and a detection circuit.

On the other hand, a gain characteristic of a mechanical system in the signal pickup device 32 shows a second-order system characteristic having a peak at the frequency of 100 Hz as indicated in FIG. 7A. Accordingly, the gain characteristic of the whole system including the signal pickup device 32, the phase compensation circuit 48, and the detection circuit 45 (46) must be selected to have the gain characteristic indicated in FIG. 6. In order to achieve the above described gain characteristic, and further simplify the circuit construction of the above phase compensation circuit 48, the phase compensation circuit 48 having a circuit construction shown in FIG. 4 is used in the present embodiment of the invention.

That is, the phase compensation circuit 48 consists of two stages of filters connected in series, mainly, a lag-lead filter comprising a diode D2, capacitors C2 and C3, and resistors R2 and R3, and a lag-lead filter comprising a diode D3, capacitors C4 and C5, and resistors R4 and R5. This phase compensation circuit 48 is originally provided in order to compensate the frequency characteristic of the signal pickup device including the cantilever, and improve the improvement factor of the tracking servo system. The gain characteristics of the lag-lead filters provided in the first and second stages of the phase compensation circuit 48 are respectively selected to be those indicated in FIGS. 7B and 7C. Thus, by selecting the gain characteristics to be those indicated in FIGS. 7B and 7C, the circuit construction of the phase compensation circuit 48 can be simplified, requiring less circuit parts.

Figure 7B:
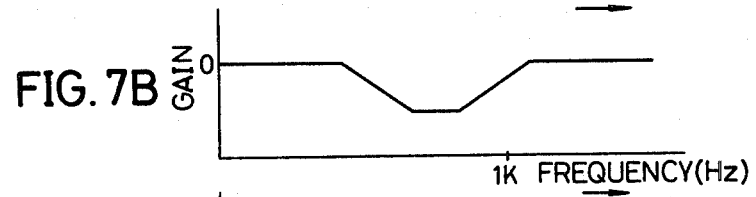
Figure 7C:
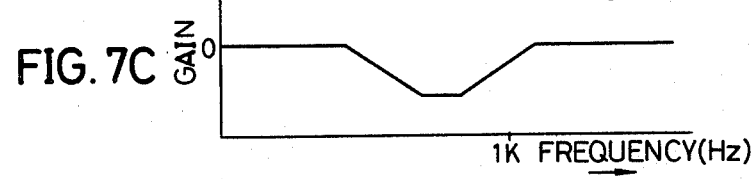
Figure 7D:
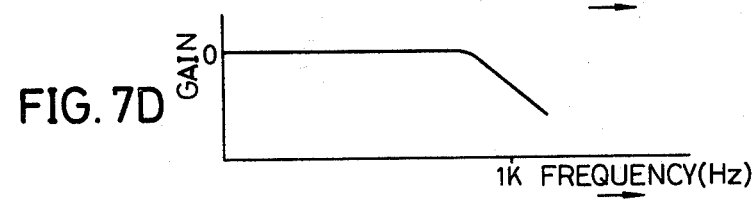

In order to combine the gain characteristics indicated in FIGS. 7A, 7B, and 7C with the gain characteristic of the detection circuit and obtain the gain characteristic indicated in FIG. 6, the gain characteristic of the detection circuit 45 (46) is selected as indicated in FIG. 7D. That is, the detection circuit 45 (46) has a lowpass filter characteristic wherein the cutoff frequency is selected at a frequency in the vicinity of the gain cross-over frequency (1 kHz in the case of the present embodiment of the invention). Therefore, the gain characteristic of the tracking servo system as a whole including the detection circuits 45 and 46 having the lowpass filter characteristics indicated in FIG. 7D, the phase compensation circuit 48 consisting of two stages of lag-lead filters connected in series respectively having the characteristics indicated in FIGS. 7B and 7C, and the signal pickup device having the characteristic indicated in FIG. 7A, is obtained as a characteristic indicated by a solid line II which is substantially equal to the characteristic indicated by the dotted line I.

The above cutoff frequency in the lowpass filter characteristic of the detection circuit may be selected to a frequency within a frequency range between one-third the gain cross-over frequency and twice the gain cross-over frequency.

Therefore, according to the detection circuit of the present invention, noise frequencies can be effectively eliminated, since the detection circuit has a lowpass filter characteristic.

Moreover, the values of the above capacitor C1 and the resistor R1 constructing the detection circuit, are selected so as to satisfy a relation $\pi f \approx 1/(C1\ R1)$. In the above relation, the value of the frequency f is equal to 1 kHz (the gain cross-over frequency). Accordingly, when the resistance of the above resistor R1 is 15 kΩ, for example, the capacitance of the capacitor becomes 0.022 μF.

In the above embodiment of the present invention, it is assumed that the video signal is an NTSC system color video signal. However, the video signal may be of the PAL system color video signal. In this case, the disc 10 is rotated at a rotational speed of 750 revolutions per minute. Furthermore, since the horizontal scanning frequency is 15.625 kHz in this case, the gain characteristic of the tracking servo system is accordingly selected to a value most suited for the particular system.

Further, the present invention is not limited to these embodiments, but various variations and modifications may be made without departing from the scope of the present invention.

What is claimed is:

1. A reference signal detection circuit in a rotary recording medium reproducing apparatus having a reproducing transducer for reproducing an information signal recorded on a rotary recording medium and reference signals for a tracking servo system, said reference signal being recorded in a form of a tone burst, said transducer reproducing said signals from said rotary recording medium rotating at a predetermined rotational speed, and tracking servo loop means responsive to said tracking servo reference signals picked up from said recording medium for performing a tracking servo operation according to the tracking servo signal, said tracking servo loop means having a gain cross-over frequency, where the open-loop gain becomes zero, said detection circuit constituting a part of said track servo loop means and comprising a single rectifying and smoothing circuit means responsive to said transducer for rectifying and smoothing said reproduced reference signals obtained in the form of tone burst, said rectifying and smoothing circuit means having a lowpass filter characteristic with a cutoff frequency which is within a frequency range between substantially one-third and twice said gain cross-over frequency in the gain characteristic of said tracking servo loop means, and means responsive to said rectifying and smoothing circuit means for producing an output which is indicative of an amplitude of the tracking servo signal.

2. A detection circuit as claimed in claim 1 in which said gain cross-over frequency is substantially equal to 1 kHz.

3. A detection circuit as claimed in claim 1 in which said tracking loop servo means further comprises a phase compensation circuit for compensating the phase of the tracking servo signal obtained by said transducer means, and said phase compensation circuit comprising two stages of lag-lead filters respectively connected in series.

4. A detection circuit as claimed in claim 1 in which said rectifying and smoothing circuit means comprises a resistor having a resistance of R1 and a capacitor having a capacitance of C1, wherein the resistance R1 and the capacitance C1 have values satisfying a relationship $\pi f \approx 1/(C1\ R1)$ where f indicates said gain cross-over frequency.

* * * * *

UNITED STATES PATENT AND TRADEMARK OFFICE
CERTIFICATE OF CORRECTION

PATENT NO. : 4,433,402

DATED : February 21, 1984

INVENTOR(S) : ISAMI KANEDA, ET AL.

It is certified that error appears in the above-identified patent and that said Letters Patent is hereby corrected as shown below:

Column 6, Claim 1, line 68, change "track" to --tracking--.

Signed and Sealed this

Fourth Day of September 1984

[SEAL]

Attest:

Attesting Officer

GERALD J. MOSSINGHOFF

Commissioner of Patents and Trademarks